United States Patent [19]

Bernard et al.

[11] Patent Number: 5,567,225
[45] Date of Patent: Oct. 22, 1996

[54] METHOD OF MAKING PIG IRON WITH ZINC RECOVERY

[75] Inventors: Johannes G. Bernard, Delft; Hendrikus K. A. Meijer, Uitgeest; Cornelis P. Teerhuis, Marken, all of Netherlands

[73] Assignee: Hoogovens Staal. B.V., CA Ijmuiden, Netherlands

[21] Appl. No.: 449,575

[22] Filed: May 24, 1995

[30] Foreign Application Priority Data

Jun. 9, 1994 [NL] Netherlands .................... 9400936

[51] Int. Cl.$^6$ ............... C21B 11/00; C22B 7/02; C22B 19/04
[52] U.S. Cl. .................... 75/453; 75/658; 75/961
[58] Field of Search .................... 75/453, 961

[56] References Cited

U.S. PATENT DOCUMENTS

| | | | |
|---|---|---|---|
| 3,915,692 | 10/1975 | Herbert et al. | 75/659 |
| 4,200,454 | 4/1980 | Maelzer et al. | |
| 4,878,943 | 9/1986 | Kepplinger. | |
| 5,364,441 | 11/1994 | Worner | 75/961 |

FOREIGN PATENT DOCUMENTS

| | | |
|---|---|---|
| 0094114 | 11/1983 | European Pat. Off. . |
| 0174641 | 3/1986 | European Pat. Off. . |
| 0316299 | 5/1989 | European Pat. Off. . |
| 0551992 | 7/1993 | European Pat. Off. . |
| 3536635 | 4/1987 | Germany . |
| 2234528 | 2/1991 | United Kingdom . |
| WO9319213 | 9/1993 | WIPO . |

*Primary Examiner*—Melvyn Andrews
*Attorney, Agent, or Firm*—Watson Cole Stevens Davis, P.L.L.C.

[57] ABSTRACT

A method making pig iron employs an in-bath direct reduction performed in a metallurgical vessel which has above it a melting cyclone in which iron-oxide-containing material fed thereinto is pre-reduced by hot reducing gas coming from the vessel. Molten material passes downwardly from the melting cyclone into the vessel. In order to recover zinc from a dust containing zinc and/or zinc oxide, the dust is fed into the melting cyclone. Zinc is allowed to vaporize out of the dust into the hot gas in the melting cyclone. The hot gas containing zinc is discharged from the melting cyclone, and zinc-containing material is extracted from this hot gas.

10 Claims, 1 Drawing Sheet

METHOD OF MAKING PIG IRON WITH ZINC RECOVERY

BACKGROUND OF THE INVENTION

1. Field of the Invention

The invention relates to a method of making pig iron by an in-bath direct reduction, in which zinc is recovered from a dust containing zinc, particularly dust containing zinc from the steel industry such as blast furnace dust or converter dust.

2. Description of the Prior Art

Large quantities of dust containing zinc and iron are produced in the steel industry. It is desirable to recover zinc from it and also to make use of the iron content. Some proposals have been made.

It is known from EP-A-94114, after having separated the coarsest dust particles from blast furnace gas in a so-called dust-catcher, to subject the dust to wet gas scrubbing, after which the slurry is separated by hydro-cycloning into a coarse, low zinc fraction which may be reused in the blast furnace as raw material containing iron, and into a fine, high zinc fraction. The fine fraction has too little zinc to be of interest hitherto for zinc recovery and, depending on prevailing environmental regulations, must be disposed of as waste or stored as chemical waste.

DE-A-3536635 describes a process of recovery of iron, zinc and other metals from steel industry dusts by feeding the dust with oxygen into a so-called melting cyclone in which under reducing conditions an iron oxide containing slag which is free of zinc is formed. The zinc vaporizes. The gas discharged from the melting cyclone is mixed with air and fuel for after-burning, and zinc oxide particles are obtained from the resulting gas by cooling. The iron oxide slag is collected in a chamber under the melting cyclone and fed from these into a steel converter partially filled with pig iron, in which it is reduced by the carbon in the pig iron.

In the context of the present invention discussed below, it should be noted that it is known from NL 257692 to pre-reduce iron ore concentrate in a melting cyclone. The pre-reduced and molten iron ore trickles down the wall of the melting cyclone into a second metallurgical vessel in which, with oxygen and fuel supplied, the pre-reduced iron ore is further reduced into pig iron. During reduction in the second metallurgical vessel, a hot reducing gas containing CO is produced which passes from the second metallurgical vessel into the melting cyclone. With oxygen supplied, the reducing gas is kept combusting in the melting cyclone and this has the effect of pre-reducing and melting the iron ore. Finally the gas is discharged from the melting cyclone as waste gas. Steel Times International (GB), 17(1993) March, No. 2, page 24, also describes this in-bath direct reduction process using a melting cyclone.

SYSTEM OF THE INVENTION

An object of the invention is to provide improved recovery of zinc from zinc-containing dust, in an iron-production process.

According to the invention there is provided a method of making pig iron by an in-bath direct reduction performed in a metallurgical vessel which has above it a melting cyclone in which iron-oxide-containing material is fed thereinto is pre-reduced by hot reducing gas coming from the vessel. The molten material passes downwardly from the melting cyclone into the vessel. This method is characterised in that, in order to recover zinc from a dust containing zinc and/or zinc oxide, (i) this dust is fed into the melting cyclone, (ii) zinc is allowed to vaporize out of the dust into the hot gas in the melting cyclone, (iii) the hot gas containing zinc is discharged from the melting cyclone, and (iv) zinc-containing material is extracted from the hot gas discharged from the melting cyclone.

Surprisingly it has been found that the gas discharged from the melting cyclone contains a great deal of zinc. By the method, a zinc fraction can be obtained with a high zinc content compared to that of the initial dust.

In the method in accordance with the invention, preferably a mixture of iron ore and the dust containing zinc is introduced into the melting cyclone. The zinc-containing dust may also contain iron compounds, e.g. iron oxide, and in this case may be introduced into the melting cyclone without iron ore. Suitably the zinc-containing dust is a dust obtained in the steel industry, such as blast furnace dust or converter dust.

Preferably, the dust containing zinc, especially if it is very fine, is turned into micropellets before being introduced into the melting cyclone. The zinc dust can be very fine. For example, secondary converter dust is smaller than 50 μm and 80% of it smaller is than 20 μm. By turning this dust into micropellets, preferably of a size substantially smaller than 3 mm, before introducing it into the melting cyclone, the material can be processed well in the melting cyclone and this prevents much dust from being carried along with the hot gas out-flow from the melting cyclone.

Preferably the micropellets are introduced into the melting cyclone in the green state, that is to say unburned. The advantage of this is that the stage of burning the micropellets may be omitted.

The dust is preferably separated from the hot gas in at least two stages. Preferably at least a coarse, relatively low zinc fraction and a fine, relatively high zinc fraction are obtained, and the fine fraction of the dust may be separated out of the gas using a scrubber, an electro-filter or a bag filter. This further concentrates the zinc in the fine fraction and produces a fine fraction with a particularly high zinc content. The hot gas may be cooled, to cause precipitation of zinc-containing material.

BRIEF INTRODUCTION OF THE DRAWINGS

The invention will now be illustrated, by way of non-limitative example, with reference to the accompanying drawing. In the drawing.

DESCRIPTION OF THE PREFERRED EMBODIMENT

Figure 1:
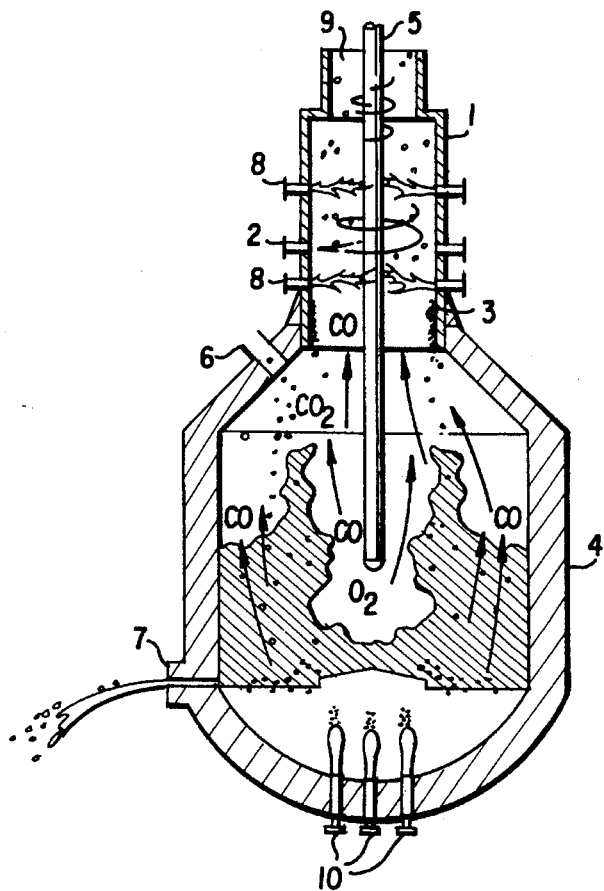
FIG. 1 shows an apparatus for the manufacture of pig iron using a melting cyclone, in which the method of the invention is applied.

In the melting cyclone 1 shown in FIG. 1 dust containing zinc as well as iron compounds is introduced via feed 2. The iron compounds in the dust are pre-reduced in the melting cyclone 1 and trickle down the wall 3 of the melting cyclone 1 into the metallurgical vessel 4 underneath. With oxygen supplied by means of a lance 5 and fuel such as coal supplied through an opening 6, the iron compounds are further reduced in this metallurgical vessel 4 into pig iron which, together with the slag formed, is tapped off through the opening 7. During the in-bath direct reduction of the iron compounds in the metallurgical vessel 4, a hot gas containing CO (and $H_2$) is created which passes upwardly into the melting cyclone 1 and in which, with oxygen supplied through opening(s) 8 to create the cyclonic rotation, combustion takes place so that the zinc vaporizes out of the zinc-containing dust. The hot gas is then discharged through an opening 9 at the top of the melting cyclone. Dust is entrained with this hot gas. This dust is separated out of the gas (by means described below and not shown in FIG. 1) as a material containing zinc in a higher concentration than the in-fed dust.

Also not shown are pelletizing means for pelletizing the feed dust prior to entry to the melting cyclone 1. Iron ore may be fed optionally, with the feed dust or as a separate feed.

FIG. 1 also shows the possibility of stirring the melt at the bottom of the metallurgical vessel 4 by bottom-bubbling using an inert gas such as argon introduced through openings 10 in the bottom of the metallurgical vessel.

The temperature in the pre-reduction in the melting cyclone may be 1500° C. or higher.

Figure 2:
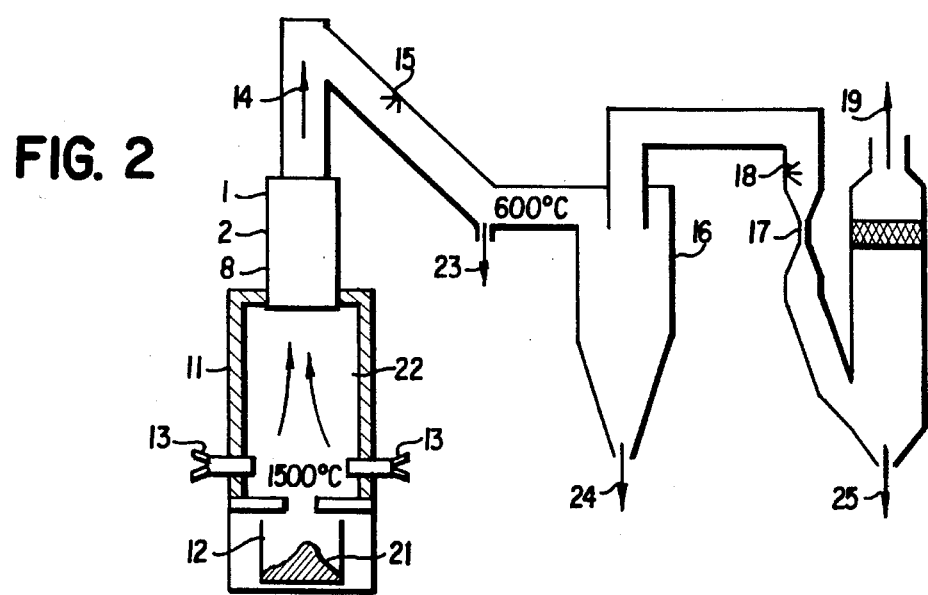
FIG. 2 shows an experimental apparatus with a melting cyclone in which the test processing of zinc-containing dust by a method analogous to the present invention is performed.

The experimental apparatus in FIG. 2 consists in part of a melting cyclone 1, a combustion chamber 11, and a collecting bin 12 for the reduced iron compounds 21. There is no metallurgical vessel corresponding to vessel 4 of FIG. 1 in this experimental apparatus. In the combustion chamber 11, burning natural gas and oxygen introduced through openings 13 produces a reducing gas with a temperature and composition which is comparable to that produced in the in-bath direct reduction in the metallurgical vessel 4 of FIG. 1. Dust containing zinc as specified below is introduced together with oxygen into the melting cyclone through openings 2 and 8. Waste gas charged with dust is discharged according to arrow 14. Water supplied via 15 cools the waste gas to 600° C. The cooling water separates out coarse material through outlet 23. Medium fine dust is separated via outlet 24 with a cyclone 16. Fine dust is separated via outlet 25 with the aid of water supply 18 to the wet venturi scrubber 17. Finally, the scrubbed waste gas is discharged via 19. A sample of the trickling, pre-reduced iron compound may be taken from the melting cyclone via outlet 22, Tests were conducted with blast furnace dust and converter dust with compositions as shown in Table 1.

TABLE 1

| Type | Zn (% wt) | Fe (% wt) | C (% wt) | SiO2 (% wt) | CaO (% wt) | MgO (% wt) | MnO (% wt) |
|---|---|---|---|---|---|---|---|
| Blast furnace dust | 4.28 | 20.30 | 39.68 | 7.80 | 4.00 | 1.40 | 0.30 |
| Converter dust | 2.40 | 33.20 | 3.62 | 6.39 | 13.23 | 6.70 | 3.93 |

Table 1 does not include other elements present in small amounts and also water in the form of free water or water of crystallisation. Water is removed by a furnace treatment prior to the processing in the melting cyclone.

The blast furnace dust consisted of the fine fraction of the dust from a blast furnace scrubber collected in a filter press. The filter cake was broken up, dried and sieved to size 3,150 μm.

The converter dust consisted of dust from the secondary dust removal system and was collected in an electrostatic filter. This dust is very fine, smaller than 50 μm. For two tests the converter dust was first turned into micropellets.

Table 2 shows the grain size distribution.

TABLE 2

| | blast furnace dust | converter dust micropellets |
|---|---|---|
| 0–250 μm | 8.0 | 6.0 |
| 250–500 μm | 11.2 | 19.3 |
| 500–1000 μm | 26.2 | 32.5 |
| 1000–2000 μm | 32.9 | 39.9 |
| 2000–3150 μm | 21.7 | 1.7 |

The blast furnace dust and the converter dust was mixed with iron ore concentrate as shown in table 3. The concentrate was Carol Lake concentrate with an iron content of 66% wt, and a particle size of 50–500 μm.

TABLE 3

| Test | Material | Mixture (%/%) | Zn (% wt.) |
|---|---|---|---|
| HO1 | iron ore concentrate/blast furnace dust | 85/15 | 0.60 |
| HO2 | iron ore concentrate/blast furnace dust | 85/15 | 0.60 |
| SA1 | iron ore concentrate/converter dust | 50/50 | 0.70 |
| SA2 | iron ore concentrate/converter dust micropellets | 50/50 | 0.70 |
| SA3 | iron ore concentrate/converter dust micropellets | 75/25 | 0.35 |

Tests were carried out with these mixtures in the experimental apparatus in FIG. 2, to simulate zinc recovery in the method of the invention. Samples were taken from the pre-reduced iron compounds at 21, the trickling material at 22, the coarse dust at 23, the medium fine dust at 24 and the fine dust at 25, and the zinc content of these samples was determined. Fractions at 23, 24 and 25 were respectively of the order of magnitude of 1, 1 and 4% wt of the quantity of mixture supplied. Table 4 gives the results. The zinc is recovered mainly in the form of ZnO.

TABLE 4

| Test | Zn input (% wt) | Zn 21 (% wt) | Zinc removal efficiency (kg/kg.100%) | Zn 22 (% wt) | Zn 23 (% wt) | Zn 24 (% wt) | Zn 25 (% wt) |
|---|---|---|---|---|---|---|---|
| HO1 | 0.60 | 0.12 | 82.6 | 0.25 | 0.94 | 1.28 | 10.0 |
| HO2 | 0.60 | 0.01 | 98.5 | 0.26 | 1.53 | 4.66 | 7.2 |
| SA1 | 0.70 | 0.18 | 79.6 | 0.40 | 1.55 | 5.85 | 17.2 |
| SA2 | 0.70 | 0.18 | 77.3 | 0.49 | 0.21 | 0.99 | 13.0 |
| SA3 | 0.35 | 0.10 | 76.2 | 0.25 | 0.42 | 1.80 | 12.3 |

In Table 4, the zinc removal efficiency of the fourth column is the ratio of the zinc passing out in the hot gas from the melting cyclone to the input zinc.

Table 4 shows that the zinc from the input mixture primarily collects into the fine dust 25. The zinc content in this fine dust is 20 to 35 times that in the input mixture supplied. There is thus a useful concentration effect, and the fourth column of Table 4 shows that the major part of the zinc fed in is recovered.

What is claimed:

1. A method of making pig iron, with recovery of zinc, comprising the steps of:

1) producing pig iron by an in-bath direct reduction process performed in a metallurgical vessel, said direct reduction process providing a hot reducing gas, ii) performing a pre-reduction of iron-oxide-containing material in a melting cyclone located above said metallurgical vessel, by feeding said iron-oxide-containing material into said melting cyclone and allowing said hot reducing gas to pass from said metallurgical vessel upwardly into said melting cyclone, while allowing molten material pre-reduced in said melting cyclone to pass downwardly into said metallurgical vessel, said iron-oxide-containing material comprising a dust containing at least one of zinc and zinc oxide, iii) allowing zinc to vaporize out of said dust in said melting cyclone, iv) discharging hot gas containing zinc from said melting cyclone, and v) extracting zinc-containing material from said hot gas discharged from said melting cyclone.

2. A method according to claim 1 wherein said dust further contains iron oxide and is fed into said melting cyclone without iron ore.

3. A method according to claim 1 wherein both iron ore and said dust are fed into said melting cyclone.

4. A method according to claim 1 wherein said dust is an iron-oxide-containing dust obtained in the steel industry.

5. A method according to claim 1 including the step of forming said dust into pellets, prior to feeding it to said melting cyclone.

6. A method according to claim 5 wherein said pellets have a size less than 3 mm.

7. A method according to claim 5 wherein said pellets are introduced into the melting cyclone in a green state.

8. A method according to claim 1 including cooling said hot gas discharged from said melting cyclone to cause precipitation of said zinc-containing material therefrom.

9. A method according to claim 1 including separating said zinc-containing material from said hot gas discharged from said melting cyclone in at least two stages to obtain respectively a first fraction of particles of relatively low zinc concentration and a second fraction of particles finer than those of said first fraction and having a higher zinc concentration than said first fraction.

10. A method according to claim 9 wherein said second fraction is separated from said hot gas by separation means selected from the group consisting of a scrubber, an electro-filter and a bag filter.

\* \* \* \* \*